United States Patent
Spencer et al.

(10) Patent No.: US 10,168,209 B2
(45) Date of Patent: Jan. 1, 2019

(54) MODULAR IMAGING SPECTROMETER ASSEMBLY AND METHOD

(71) Applicant: RAYTHEON COMPANY, Waltham, MA (US)

(72) Inventors: Susan B. Spencer, Rolling Hills Estates, CA (US); Lacy G. Cook, El Segundo, CA (US); Andrew L. Bullard, Manhattan Beach, CA (US); John F. Silny, Playa Vista, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/481,834

(22) Filed: Apr. 7, 2017

(65) Prior Publication Data
US 2018/0292258 A1 Oct. 11, 2018

(51) Int. Cl.
*G01J 3/02* (2006.01)

(52) U.S. Cl.
CPC ............ *G01J 3/0202* (2013.01); *G01J 3/0208* (2013.01); *G01J 3/0235* (2013.01); *G01J 3/0291* (2013.01); *G01J 3/0294* (2013.01)

(58) Field of Classification Search
CPC ...... G01J 3/0202; G01J 3/0291; G01J 3/0294; G01J 3/0235; G01J 3/0208
See application file for complete search history.

(56) References Cited

U.S. PATENT DOCUMENTS

| 4,060,327 A | * | 11/1977 | Jacobowitz | ............... | G01J 3/10 356/328 |
| 5,260,767 A | * | 11/1993 | Cook | ........................ | G01J 3/02 356/326 |
| 5,420,681 A | | 5/1995 | Woodruff | | |

(Continued)

FOREIGN PATENT DOCUMENTS

WO 2014018143 A1 1/2014

OTHER PUBLICATIONS

Warren et al., "New Family of Refractive Imaging Spectrographs", SPIE, vol. 2863, Nov. 1, 1996, pp. 287-294.
(Continued)

*Primary Examiner* — Dominic J Bologna
(74) *Attorney, Agent, or Firm* — Lando & Anastasi, LLP (57) ABSTRACT

Aspects and embodiments are generally directed to modular imaging spectrometer assemblies and methods of operation thereof. In one example, a modular imaging spectrometer assembly includes foreoptics to receive electromagnetic radiation and produce a real exit pupil, the foreoptics having a first f-number, a first imaging spectrometer to receive and disperse the electromagnetic radiation into a first plurality of spectral bands at a first image plane, the first imaging spectrometer having a second f-number independent of the first f-number, a second imaging spectrometer separated from the first imaging spectrometer, the second imaging spectrometer to receive and disperse the electromagnetic radiation into a second plurality of spectral bands, the second imaging spectrometer having a third f-number inde-
(Continued)

pendent of the first f-number, and at least one slit aperture positioned to receive the electromagnetic radiation from the real exit pupil and direct the electromagnetic radiation to the first and second imaging spectrometers.

14 Claims, 10 Drawing Sheets

(56) References Cited

U.S. PATENT DOCUMENTS

| | | | | |
|---|---|---|---|---|
| 5,880,834 | A | * | 3/1999 | Chrisp ............... G01J 3/02 356/305 |
| 5,900,942 | A | | 5/1999 | Spiering |
| 7,609,381 | B2 | | 10/2009 | Warren |
| 2004/0257563 | A1 | | 12/2004 | Miller et al. |
| 2010/0053609 | A1 | * | 3/2010 | Chrisp ............... G01J 3/02 356/328 |
| 2012/0228519 | A1 | * | 9/2012 | Gilmore ............ G01N 21/645 250/459.1 |
| 2014/0071449 | A1 | * | 3/2014 | Robinson ........... G01J 3/0291 356/328 |

OTHER PUBLICATIONS

De Clercq et al., "ELOIS: An Innovative Spectrometer Design Using a Free-form Grating", Optical Systems Design 2015: Optical Design and Engineering VI, SPIE, vol. 9626, Sep. 23, 2015.
International Search Report and Written Opinion for application No. PCT/US2018/017017 dated May 16, 2018.

* cited by examiner

TABLE 1

| SURFACE | RDY, INCHES | THI, INCHES | GLA | DECENTERS (XDE, YDE AND ZDE) AND TILTS (ADE, BDE AND CDE) | | | |
|---|---|---|---|---|---|---|---|
| OBJ: | INFINITY | -14.8687 | AIR | | | | |
| | INFINITY | 0 | AIR | | | | |
| STO: | INFINITY | 0 | AIR | XDE: 0 | YDE: 1.996000 | ZDE: 0 | ADE: -7.584748 BDE: 0 CDE: 0 |
| 3 | INFINITY | 14.8687 | AIR | XDE: 0 | YDE: 1.996000 | ZDE: 0 | ADE: -7.584748 BDE: 0 CDE: 0 REV |
| 4 | INFINITY | 5.251124 | AIR | | | | |
| 5 | INFINITY | 4.890134 | AIR | | | | |
| 6 | -11.4047 ASP | 0 | REFL | XDE: 0 | YDE: 0.004314 | ZDE: 0 | ADE: 0 BDE: 0 CDE: 0 |
| 7 | K: -0.32141 CUF | | | | | | |
| 7 | A: -0.000822461 E: 0.00000000002037 | B: 0.369595E-05 F: -0.89935E-11 | C: -0.63700E-07 G: 0 | D: 0.147788E-08 H: 0 | | | |
| 8 | INFINITY | 4.890111 | REFL | | | | |
| 9 | -7.5471 ASP | 0 | REFL | | | | |
| 9 | K: -1.17753 CUF | | | | | | |
| 9 | A: 0.000103762 E: 0.0000001683990 | B: 0.11760E-03 F: -0.62639E-07 | C: -0.14084E-04 G: 0 | D: 0.94313E-06 H: 0 | | | |
| 10 | INFINITY | 5.09103 | REFL | | | | |
| 11 | -17.00074 ASP | 0 | AIR | | | | |
| 11 | K: -1.40705 CUF | | | | | | |
| 11 | A: -0.000434327 E: 0.00000000381804 | B: -0.25472E-05 F: -0.42651E-09 | C: 0.43095E-06 G: 0 | D: -0.26412E-07 H: 0 | | | |
| 12 | INFINITY | 0 | AIR | | | | |
| 13 | INFINITY | 0 | AIR | | | | |
| 14 | INFINITY | 0 | AIR | | | | |

| SURFACE | RDY, INCHES | THI, INCHES | GLA | DECENTERS (XDE, YDE AND ZDE) AND TILTS (ADE, BDE AND CDE) | | | |
|---|---|---|---|---|---|---|---|
| 15 | INFINITY | 0 | AIR | | | | |
| 16 | INFINITY | 0 | AIR | | YDE: −1.769000 | ZDE: 0 | ADE: 0 | BDE: 0 | CDE: 0 |
| 17 | INFINITY | | REFL | | | | ADE: −17 | BDE: 0 | CDE: 0 |
| 17 | HOE | | HOR: 1 | | | | | |
| | HV1: REA | HY1: 0 | HZ1: 1e+20 | | | | | |
| | HX1: 0 | HY2: 0 | HZ2: −1e+20 | | | | | |
| | HX2: 0 | HCT: XY | | | | | | |
| | HWL: 10630 | | | | | | | |
| | BLT: IDEAL | | | | | | | |
| | HCO | | | | | | | |
| | C2: −0.23186 | | | | | | | |
| 18 | INFINITY | 0 | AIR | XDE: 0 | YDE: 0 | ZDE: 0 | ADE: −37.116387 | BDE: 0 | CDE: 0 |
| 19 | INFINITY | 0 | AIR | XDE: 0 | YDE: 0 | ZDE: 0 | ADE: 0 | BDE: 0 | CDE: 180 |
| 20 | INFINITY | 0 | AIR | XDE: 0 | YDE: 0 | ZDE: 0 | ADE: 0 | BDE: 0 | CDE: 0 |
| 21 | INFINITY | 0 | AIR | XDE: 0 | YDE: 0 | ZDE: 0 | ADE: 0 | BDE: 0 | CDE: 0 |
| 22 | INFINITY | 0 | AIR | XDE: 0 | YDE: 0 | ZDE: 0 | ADE: 0 | BDE: 0 | CDE: 0 |
| 23 | INFINITY | 0 | AIR | XDE: 0 | YDE: 0 | ZDE: 0 | ADE: 0 | BDE: 0 | CDE: 0 |
| 24 | INFINITY | 0 | AIR | | | | | |
| 25 | INFINITY | 1.83615 | AIR | | | | | |
| 26 | INFINITY | 0.675828 | REFL | XDE: 0 | YDE: 1.002932 | ZDE: 0 | ADE: −18.806758 | BDE: 0 | CDE: 0 |
| 27 | −8.36691 | | | | | | | |
| 27 | SPS Z FR | K: −2.1254 | NRADIUS: 1.6644 | ZF1: −1.9935E−01 | | | |
| 27 | SCO | Z3: 1.4863E−01 | Z4: −2.364E−02 | Z5: 4.3076E−02 | | | |
| | | Z7: 8: 1.3032E−02 | Z7/9: −5.430E−03 | Z7/11: 1.624E−03 | | | |
| | | Z8: 6.9741E−03 | Z7/13: 6.3097E−03 | Z7/16: 1.455E−03 | | | |
| | | Z12: 1.0761E−03 | Z7/15: 1.593E−03 | Z7/20: 2.103E−03 | | | |
| | | Z17: −8.3552E−14 | Z7/20: 1.599E−03 | Z7/25: 2.538E−06 | Z7/21: 2.103E−03 | | |
| | | Z24: 8.3552E−04 | Z7/25: 2.538E−06 | Z7/27: 3.412E−04 | | | |
| | | Z31: 2.6895E−04 | Z7/32: 1.4069E−04 | Z7/35: 5.285E−05 | | | |
| | | Z36: 2.4752E−05 | Z7/37: −1.0475E−05 | | | | |

| SURFACE | RDY, INCHES | THI, INCHES | GLA | DECENTERS (XDE, YDE AND ZDE) AND TILTS (ADE, BDE AND CDE) |
|---|---|---|---|---|
| 28 | INFINITY | -1.811485 | | |
| | -2.89404 | 0 | REFL | |
| 29 | SPS Z FR | FR | | |
| 29 | SCO | | K: 1.0895E-01 MRADIUS: 0.84023 ZF1: 1.1369E-01<br>ZF3: 7.1920E-02 ZF4: 9.7750E-04 ZF5: 3.8725E-02<br>ZF8: -1.1085E-03 ZF9: 6.1952E-05 ZF11: 1.4849E-03<br>ZF12: 5.4417E-04 ZF15: -7.6401E-04 ZF16: 6.9743E-05<br>ZF17: -1.5268E-04 ZF20: 9.1103E-05 ZF21: -7.9333E-05<br>ZF24: -6.8709E-05 ZF25: 8.1108E-06 ZF27: 3.3362E-05<br>ZF31: 1.9596E-05 ZF32: -2.0817E-06 ZF35: -9.3295E-06<br>ZF36: 5.2611E-06 ZF37: 1.1578E-06 | |
| 30 | INFINITY | 1.811485 | | |
| 31 | -3.95271 | 0 | REFL | |
| 31 | SPS Z FR | | | |
| 31 | SCO | | K: 3.6458E-01 MRADIUS: 2.8577 ZF1: 2.7764E-01<br>ZF3: 2.9966E-02 ZF4: 3.5527E-01 ZF5: 1.1168E-01<br>ZF8: 2.1052E-03 ZF9: 1.0500E-02 ZF11: 8.7025E-03<br>ZF12: 7.234E-03 ZF15: -6.1726E-03 ZF16: 2.5431E-03<br>ZF17: -1.0743E-02 ZF20: 8.2325E-03 ZF21: -2.4321E-03<br>ZF24: -2.7443E-03 ZF25: 9.6341E-04 ZF27: 4.3359E-03<br>ZF31: 2.2455E-03 ZF32: -4.2071E-04 ZF35: -7.8705E-04<br>ZF36: 6.3132E-05 ZF37: -6.1655E-05 | |
| 32 | INFINITY | -2.855148 | AIR | XDE: 0 YDE: -20.36486 ZDE: 0 ADE: 0.000135 BDE: 0 CDE: 0 |
| 33 | INFINITY | 0 | AIR | |
| IMG. | INFINITY | 0 | | |

FIG. 7C

MODULAR IMAGING SPECTROMETER ASSEMBLY AND METHOD

FEDERALLY SPONSORED RESEARCH

This invention was made with government support under Grant No. [withheld] awarded by [federal agency withheld]. The U.S. government has certain rights in this invention.

BACKGROUND

Imaging spectroscopy is widely used in many remote sensing applications. For instance, collected spectral data is often used for automated remote material detection, identification, and quantification. A typical imaging spectrometer images an object or scene in a range of different adjacent wavelength intervals. For instance, these intervals may include the visible and near-infrared (VNIR) wavelength band, the short-wave infrared (SWIR) wavelength band, the mid-wavelength infrared (MWIR) wavelength band, and the long-wave infrared (LWIR) wavelength band. Based on the resulting spectral image, a user of the imaging spectrometer may detect the unique spectral characteristics or features of the imaged object or scene.

SUMMARY OF THE INVENTION

Aspects and embodiments are generally directed to a modular imaging spectrometer assembly and a method of operation thereof. As discussed in further detail below, examples of the assembly may include foreoptics that are arranged to receive electromagnetic radiation and produce a real exit pupil. Electromagnetic radiation from the real exit pupil is received at one or more imaging spectrometers, each of which has a corresponding f-number that is independent of an f-number of the foreoptics. In particular, each imaging spectrometer of the assembly may have an f-number that is different from the f-number of the foreoptics, as well as, the other imaging spectrometers. Accordingly, examples of the modular imaging spectrometer assembly and methods described herein permit one or more imaging spectrometers to share a common foreoptics assembly without requiring a common f-number.

Various examples of the modular imaging spectrometer assembly described herein provide a configurable and customizable imaging spectrometer assembly arrangement that may be adapted based on the application, imaging conditions, or desired performance. Various other benefits and advantages of the modular imaging spectrometer assembly and method of operation are described below with reference to the drawings.

According to various aspects, provided is a modular imaging spectrometer assembly. In one example, the modular imaging spectrometer assembly comprises foreoptics positioned to receive electromagnetic radiation from a scene and produce a real exit pupil, the foreoptics having a first f-number, a first imaging spectrometer including a first optical assembly configured to receive and disperse the electromagnetic radiation into a first plurality of spectral bands at a first image plane, the first imaging spectrometer having a second f-number that is independent of the first f-number, a second imaging spectrometer spatially separated from the first imaging spectrometer, the second imaging spectrometer including a second optical assembly configured to receive and disperse the electromagnetic radiation into a second plurality of spectral bands at a second image plane, the second imaging spectrometer having a third f-number that is independent of the first f-number, and at least one slit aperture interposed between the foreoptics and the first imaging spectrometer and the second imaging spectrometer, the at least one slit aperture being positioned to receive the electromagnetic radiation from the real exit pupil and direct the electromagnetic radiation to the first imaging spectrometer and the second imaging spectrometer.

In various examples, the second f-number and the third f-number are independent of each other. In a particular example, each of the first f-number, second f-number, and third f-number has a different value. According to certain examples, the at least one slit aperture includes a first slit aperture configured to direct the electromagnetic radiation along a first optical path to the first imaging spectrometer and a second slit aperture configured to direct the electromagnetic radiation along a second optical path to the second imaging spectrometer.

In various examples, the first optical assembly is a first all-reflective optical assembly. According to certain examples, the first all-reflective optical assembly includes a first plurality of collimating optics to receive the electromagnetic radiation from the at least one slit aperture, a first dispersive element positioned to receive the electromagnetic radiation from the first plurality of collimating optics and disperse the electromagnetic radiation into the first plurality of spectral bands, and a first plurality of focusing optics to focus the dispersed electromagnetic radiation at the first image plane. According to at least one example, the first plurality of collimating optics is a first reflective triplet and the first plurality of focusing optics is a second reflective triplet. In certain examples, the first dispersive element is a diffraction grating. In at least one example, the second optical assembly is a second all-reflective optical assembly.

According to certain examples, the second all-reflective optical assembly includes a second plurality of collimating optics to receive the electromagnetic radiation from the at least one slit aperture, a second dispersive element positioned to receive the electromagnetic radiation from the second plurality of collimating optics and disperse the electromagnetic radiation into the second plurality of spectral bands, and a second plurality of focusing optics to focus the dispersed electromagnetic radiation at the second image plane. In at least one example, the second plurality of collimating optics is a third reflective triplet and the second plurality of focusing optics is a fourth reflective triplet.

In various examples, the first imaging spectrometer includes a first optical sensor positioned at the first image plane at configured to detect electromagnetic radiation within the long-wave infrared (LWIR) spectrum, and wherein the second imaging spectrometer includes a second optical sensor positioned at the second image plane at configured to detect electromagnetic radiation within the short-wave infrared (SWIR) spectrum. In certain examples, the foreoptics is an all-reflective foreoptics assembly.

According to various aspects, provided is a method of operating a modular imaging spectrometer assembly. In one example, the method may comprise acts of receiving electromagnetic radiation from a scene with foreoptics having a first f-number, directing the electromagnetic radiation from a real exit-pupil of the foreoptics along a first optical path to a first imaging spectrometer and along a second optical path to a second imaging spectrometer, the first optical path being spatially separated from the second optical path, with the first imaging spectrometer, dispersing the electromagnetic radiation into a first plurality of spectral bands and focusing the first plurality of spectral bands onto a first image plane of the first imaging spectrometer, the first imaging spectrometer having a second f-number that is independent of the first f-number, and with the second imaging spectrometer, dispersing the electromagnetic radiation into a second plurality of spectral bands and focusing the second plurality of spectral bands onto a second image plane of the second imaging spectrometer, the second imaging spectrometer having a third f-number that is independent of the first f-number.

In various examples, the second f-number and the third f-number are independent of each other. In a particular example, each of the first f-number, second f-number, and third f-number has a different value. According to at least one example, the method further comprises, with the first imaging spectrometer, collimating the electromagnetic radiation prior to dispersing the electromagnetic radiation, and, with the second imaging spectrometer, collimating the electromagnetic radiation prior to dispersing the electromagnetic radiation.

According to certain examples, collimating the electromagnetic radiation with the first imaging spectrometer includes passing the electromagnetic radiation through a first plurality of mirrors of a first reflective triplet, and wherein collimating the electromagnetic radiation with the second imaging spectrometer includes passing the electromagnetic radiation through a second plurality of mirrors of a second reflective triplet. In at least one example, focusing the first plurality of spectral bands onto the first image plane of the first imaging spectrometer includes passing the electromagnetic radiation through a third plurality of mirrors of a third reflective triplet, and wherein focusing the second plurality of spectral bands onto the second image plane of the second imaging spectrometer includes passing the electromagnetic radiation through a fourth plurality of mirrors of a fourth reflective triplet.

According to another aspect, provided is a modular imaging spectrometer assembly. In one example, the modular imaging spectrometer assembly comprises foreoptics positioned to receive electromagnetic radiation from a scene and produce a real exit pupil, the foreoptics having a first f-number, a first imaging spectrometer including a first optical assembly configured to receive and disperse the electromagnetic radiation into a first plurality of spectral bands at a first image plane, the first imaging spectrometer having a second f-number that is independent of the first f-number, and a first optical sensor positioned at the first image plane and configured to receive and image the first plurality of spectral bands, and a second imaging spectrometer spatially separated from the first imaging spectrometer, the second imaging spectrometer including a second optical assembly configured to receive and disperse the electromagnetic radiation into a second plurality of spectral bands at a second image plane, the second imaging spectrometer having a third f-number that is independent of the first f-number, and a second optical sensor positioned at the second image plane and configured to receive and image the second plurality of spectral bands.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are generally directed to a modular imaging spectrometer assembly and a method of operation thereof. In one example, the spectrometer assembly includes one or more imaging spectrometers that share common foreoptics and that each have an f-number that is independent of an f-number of the foreoptics. The foreoptics are arranged to receive electromagnetic radiation from a viewed scene and produce a real exit pupil. Electromagnetic radiation from the real exit pupil is passed through the one or more imaging spectrometers to produce a spectral image at a corresponding image plane. In addition to being spatially separated from the foreoptics, each imaging spectrometer of the assembly may have an f-number that is different from the f-number of the foreoptics and different from the f-numbers of the other imaging spectrometers of the assembly.

It is to be appreciated that embodiments of the systems and apparatuses discussed herein are not limited in application to the details of construction and the arrangement of components set forth in the following description or illustrated in the accompanying drawings. The systems and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
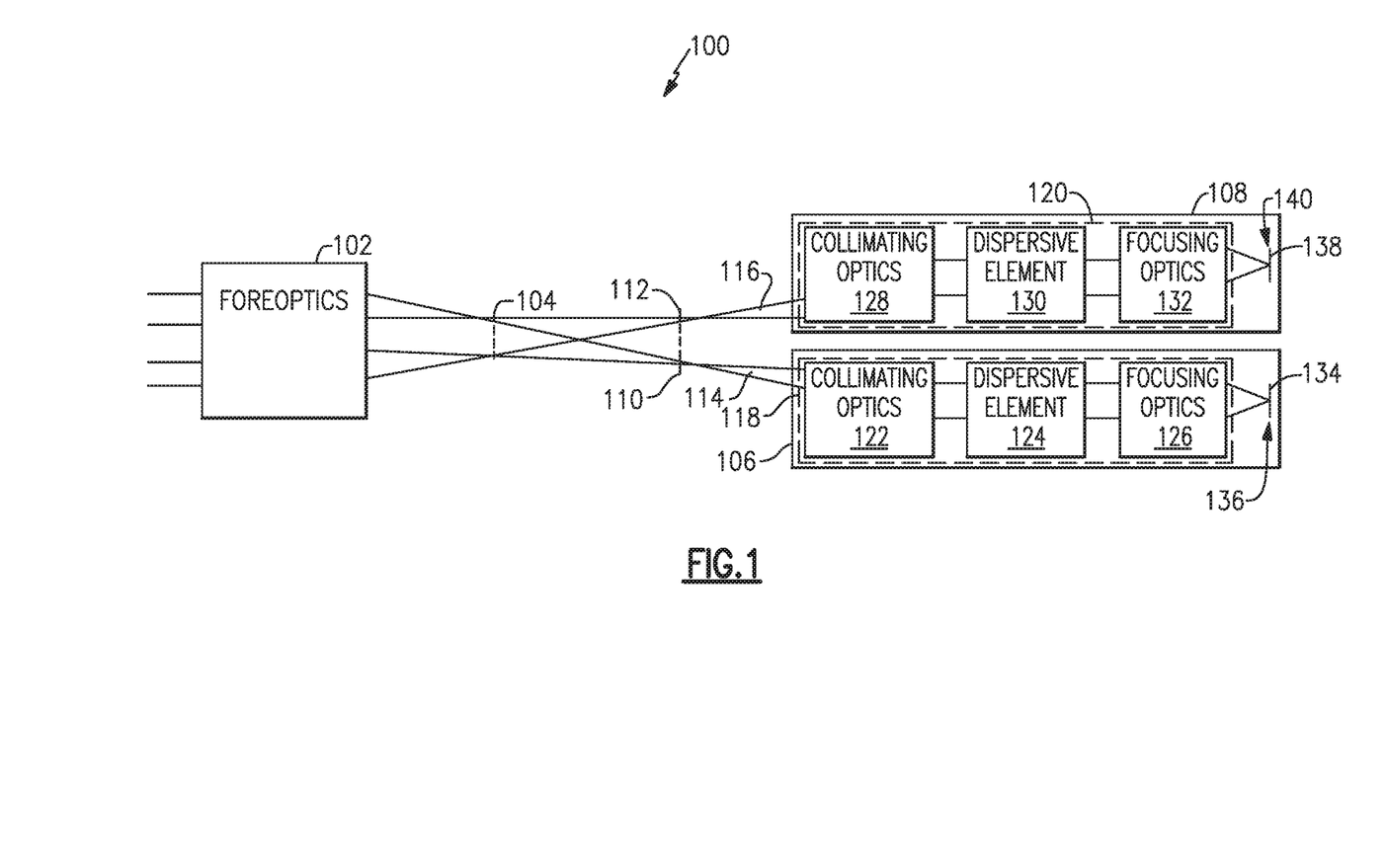
FIG. 1 is a block diagram of a modular imaging spectrometer assembly according to various examples discussed herein.

Referring to FIG. 1, there is illustrated a block diagram of one example of a modular imaging spectrometer assembly 100 according to embodiments discussed herein. As illustrated, the modular imaging spectrometer assembly 100 ("spectrometer assembly" 100) includes foreoptics 102 positioned to receive electromagnetic radiation from a scene and produce a real exit pupil 104. The spectrometer assembly 100 further includes one or more imaging spectrometers (e.g., a first imaging spectrometer 106 and a second imaging spectrometer 108) that each has an optical assembly that receives and disperses the electromagnetic radiation into a plurality of spectral bands at a corresponding image plane. Interposed between the one or more imaging spectrometers and the foreoptics 102 is one or more beam directing elements, such as the first slit aperture 110 and the second slit aperture 112 illustrated in FIG. 1.

The first and second slit apertures 110, 112 receive the electromagnetic radiation from the real exit pupil 104 and direct the electromagnetic radiation to the one or more imaging spectrometers. In the shown example, the first imaging spectrometer 106 is spatially separated from the second imaging spectrometer 108. Accordingly, the first slit aperture 110 may direct the electromagnetic radiation along a first optical path 114 to the first imaging spectrometer 106, and the second slit aperture 112 may direct the electromagnetic radiation along a second optical path 116 to the second imaging spectrometer 108.

Each of the illustrated imaging spectrometers 106, 108 may have an associated optical assembly (e.g., the first optical assembly 118 and the second optical assembly 120). Each assembly 118, 120 may include an arrangement of collimating optics, a dispersive element, and an arrangement of focusing optics. In FIG. 1, the first imaging spectrometer 106 is shown as having a first plurality of collimating optics 122, a first dispersive element 124, and a first plurality of focusing optics 126. As shown, the first plurality of collimating optics 122 may be separated from the first plurality of focusing optics 126 by the first dispersive element 124.

Similarly, the second imaging spectrometer 108 is shown as having a second plurality of collimating optics 128, a second dispersive element 130, and a second plurality of focusing optics 132. The second plurality of collimating optics 128 may be separated from the second plurality of focusing optics 132 by the second dispersive element 130. Each optical assembly 118, 120 may provide non-unity magnification from the associated slit aperture 110, 112 to the corresponding image plane. Examples of each of the first and second plurality of collimating optics 122, 128, the first and second dispersive elements 124, 130, and the first and second focusing optics 126, 132 are further described below with reference to one or more of FIGS. 2-6.

As further illustrated in FIG. 1, each imaging spectrometer 106, 108 may also include an optical sensor positioned at the corresponding image plane (i.e., final image plane). For instance, the first imaging spectrometer 106 may have a first optical sensor 134 positioned at the image plane 136 of the first imaging spectrometer 106, and the second imaging spectrometer 108 may have a second optical sensor 138 positioned at the image plane 140 of the second imaging spectrometer 108. Each optical sensor 134, 138 is positioned to detect the electromagnetic radiation passed through the corresponding imaging spectrometer and dispersed into a plurality of spectral bands received at the corresponding image plane. Based on the flux of the accumulated electromagnetic radiation, each optical sensor 134, 138 may generate one or more spectral images.

As illustrated in FIG. 1, the spectrometer assembly 100 may be arranged in a single-pass configuration. That is, the received electromagnetic radiation is passed in a single direction from an entrance pupil of the foreoptics 102 to the image plane 136, 140 of each respective imaging spectrometer 106, 108. In addition to the other benefits discussed herein, a single-pass arrangement reduces the amount of undesirable stray light within the spectrometer assembly 100. Moreover, each of the first and second imaging spectrometers 106, 108 may have an f-number that is independent of an f-number of the foreoptics 102. In certain examples, the f-number of each imaging spectrometer 106, 108 may also be independent of the other imaging spectrometer(s). Accordingly, each of the foreoptics 102, the first imaging spectrometer 106, and the second imaging spectrometer 108 may have a different f-number value. As such, various implementations of the spectrometer assembly 100 shown in FIG. 1 provide a configurable and customizable imaging spectrometer assembly arrangement that may be adapted based on the application, imaging conditions, or desired performance. Such an arrangement offers functionality that is not currently available by typical imaging spectrometer arrangements.

Figure 2:
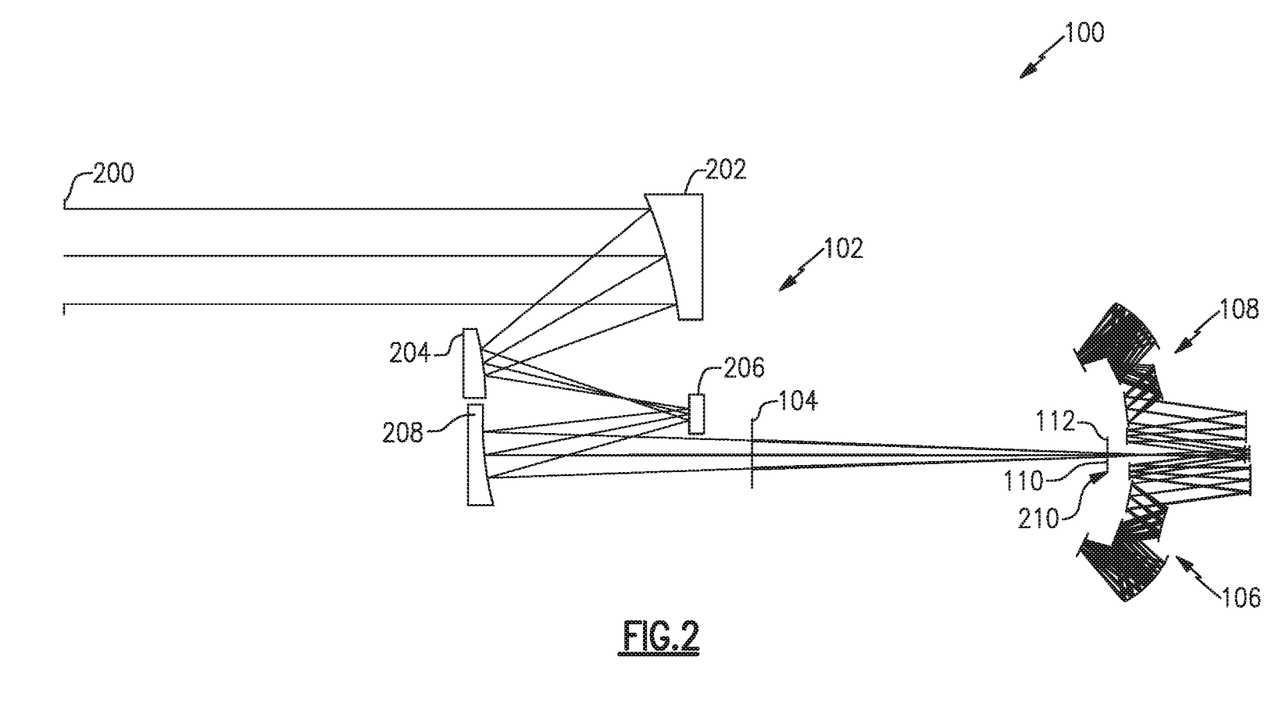
FIG. 2 is an optical arrangement of the modular imaging spectrometer assembly of FIG. 1, according to various examples discussed herein.
Figure 3:
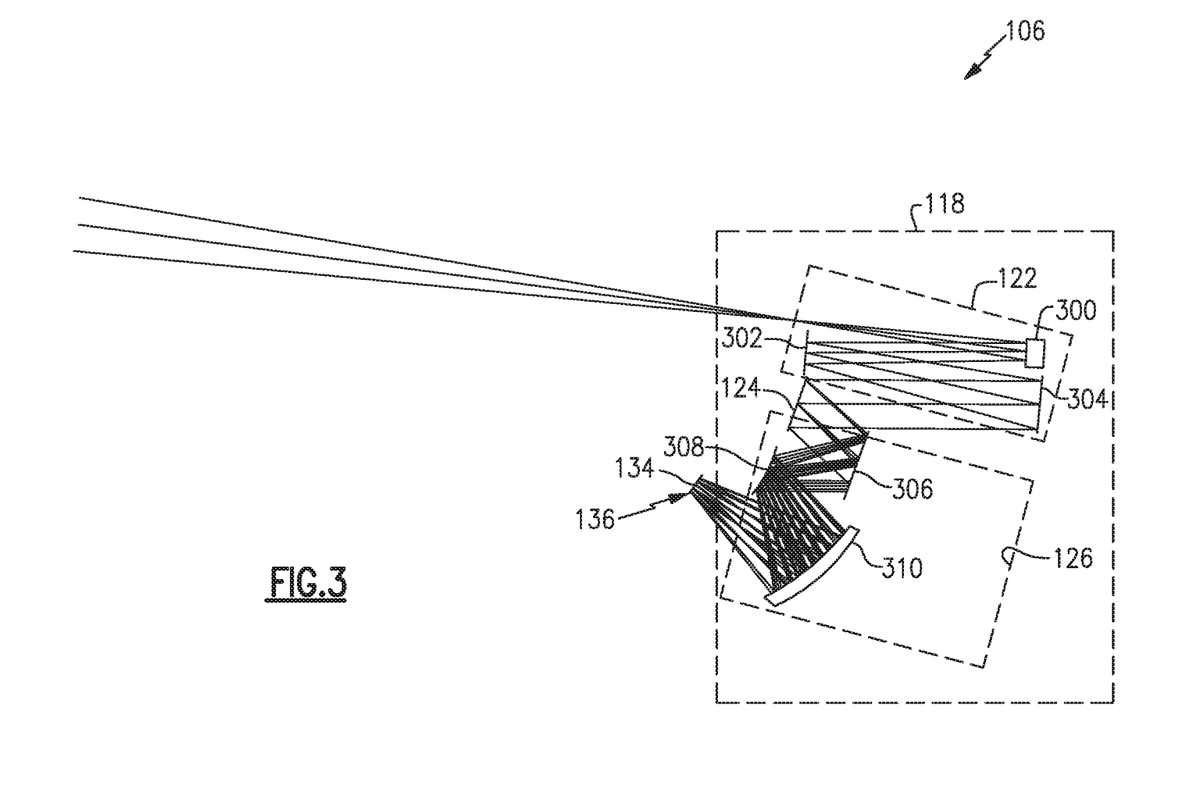
FIG. 3 is an enhanced profile view of a first imaging spectrometer of the modular imaging spectrometer assembly of FIG. 1, according to various examples discussed herein.
Figure 4:
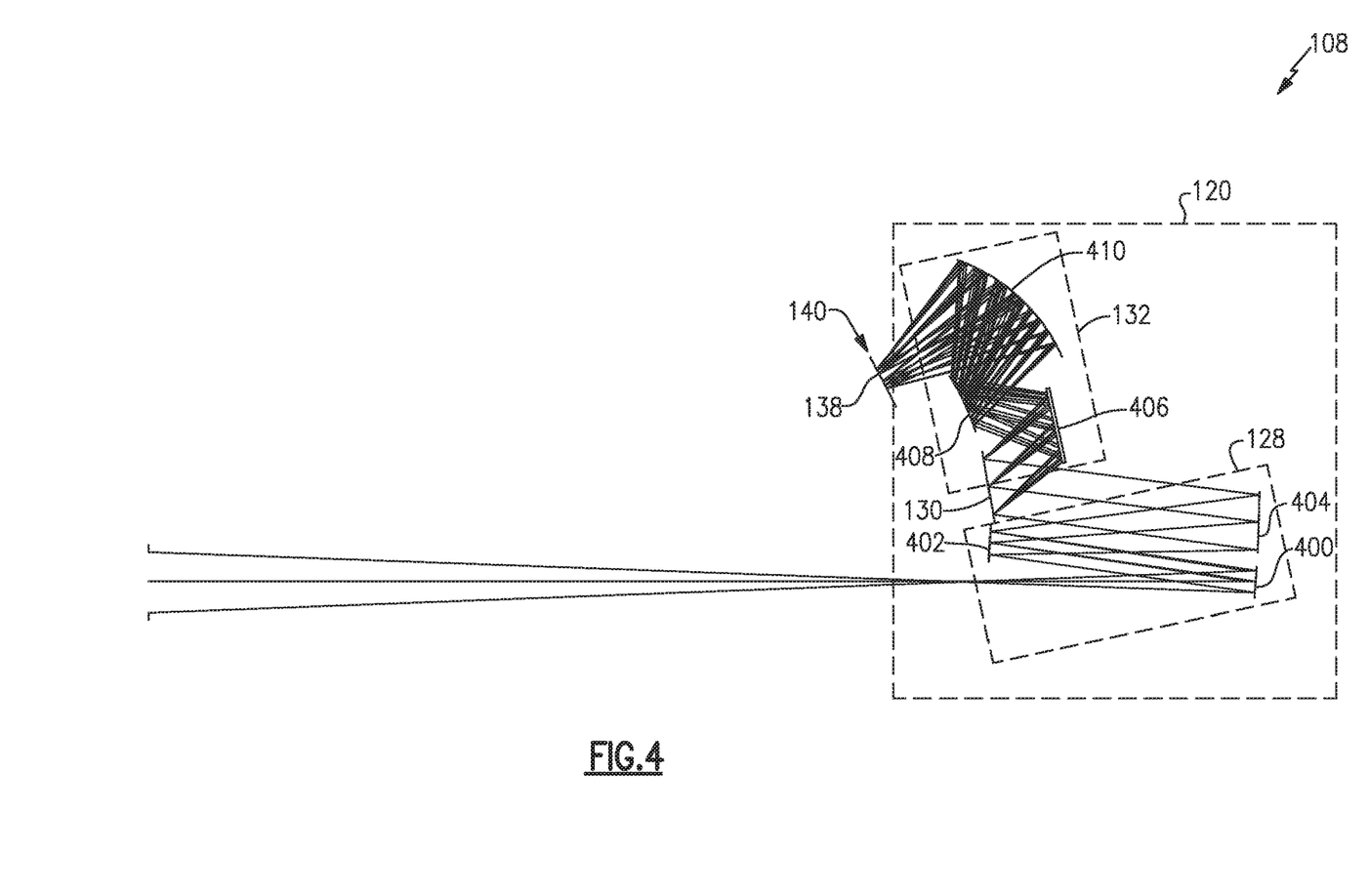
FIG. 4 is an enhanced profile view of a second imaging spectrometer of the modular imaging spectrometer assembly of FIG. 1, according to various examples discussed herein.
Figure 5:
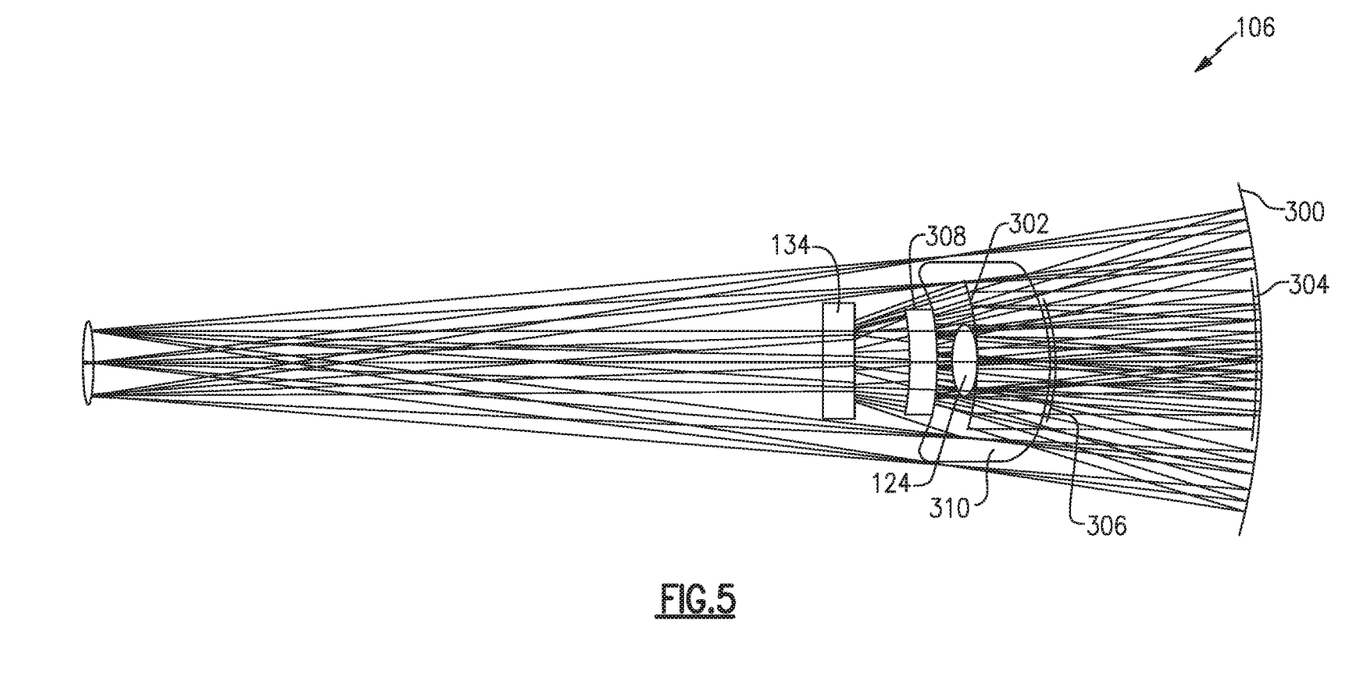
FIG. 5 is a top-side view of the first imaging spectrometer of FIG. 3, according to various examples discussed herein.
Figure 6:
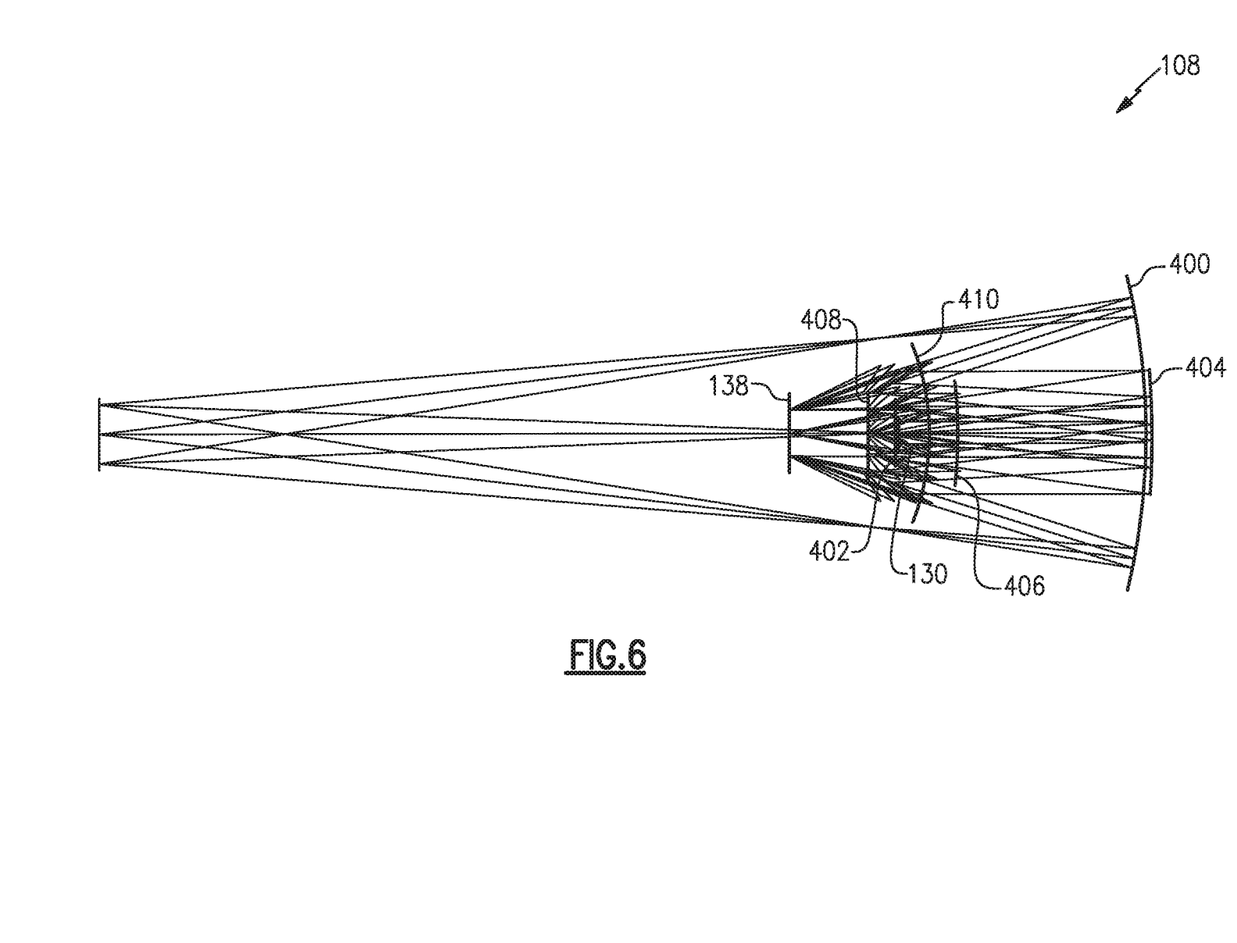
FIG. 6 is a top-side view of the second imaging spectrometer of FIG. 4, according to various examples discussed herein.

Referring to FIG. 2, there is illustrated an optical arrangement of the modular imaging spectrometer assembly 100 shown in FIG. 1. In particular, FIG. 2 illustrates one example of the optical elements of the foreoptics 102, the first imaging spectrometer 106, and the second imaging spectrometer 108. FIG. 3 illustrates a more detailed profile view of the first imaging spectrometer 106 and associated optical assembly 118, FIG. 4 illustrates a more detailed profile view of the second imaging spectrometer 108 and associated optical assembly 120, FIG. 5 illustrates a top-side view of the first imaging spectrometer 106, and FIG. 6 illustrates a top-side view of the second imaging spectrometer 108.

Referring to FIG. 2, the foreoptics 102 may receive electromagnetic radiation an entrance pupil 200. As shown, the foreoptics 102 may include an all-reflective foreoptics assembly that produces a real exit pupil 104. In one instance, the real entrance pupil 104 may offer the benefit of complete cold shielding during infrared applications. The all-reflective foreoptics assembly may include a foreoptics primary mirror 202, a foreoptics secondary mirror 204, a foreoptics tertiary mirror 206, and a foreoptics quaternary mirror 208.

Electromagnetic radiation from the entrance pupil 200 is received at the foreoptics primary mirror 202, where it is directed by the foreoptics primary mirror 202 in a direction of the foreoptics secondary mirror 204. Electromagnetic radiation from the foreoptics primary mirror 202 is received at the foreoptics secondary mirror 204, where it is directed by the foreoptics secondary mirror 204 in the direction of the foreoptics tertiary mirror 206. Electromagnetic radiation from the foreoptics secondary mirror 204 is received at the foreoptics tertiary mirror 206, where it is directed by the foreoptics tertiary mirror 206 in the direction of the foreoptics quaternary mirror 208. Electromagnetic radiation from the foreoptics tertiary mirror 206 is received at the foreoptics quaternary mirror 208, where it is directed to produce the real exit pupil 104. While illustrated in FIG. 2 as an arrangement of mirrors, in various other examples, the foreoptics 102 may include an arrangement of lenses, or an arrangement of lenses and mirrors.

According to an example, electromagnetic radiation from the real exit pupil 104 is imaged at an image plane 210 of the foreoptics 102. As shown, the one or more beam directing element (e.g., the first slit aperture 110 and the second slit aperture 112) may be positioned at the image plane 210 of the foreoptics 102 to direct the electromagnetic radiation to the one or more imaging spectrometers. While in one example the beam directing element may include a plurality of slit apertures which correspond in number to the number of imaging spectrometers of the spectrometer assembly 100, in various other examples, the beam directing element may include one or more wavelength splitting elements, such as a dichroic beamsplitter. In the shown illustration, the first slit aperture 110 directs the electromagnetic radiation along the first optical path 114 (shown in FIG. 1) to the first optical assembly 118 (shown in FIG. 1) of the first imaging spectrometer 106, and the second slit aperture 112 directs the electromagnetic radiation along the second optical path 116 (shown in FIG. 1) to the second optical assembly 120 (shown in FIG. 1) of the second imaging spectrometer 108. While the example of the spectrometer assembly 100 shown in FIG. 2 includes two imaging spectrometers, it is appreciated that in various other arrangements any desirable number of imaging spectrometers may be used. That is, only a first imaging spectrometer 106 and a second imaging spectrometer 108 are shown in FIG. 2 for the purpose of illustration only.

Referring to FIG. 3, there is illustrated a more detailed profile view of the first imaging spectrometer 106, and associated optical assembly 118. Electromagnetic radiation directed along the first optical path 114 (shown in FIG. 1) is received at the first plurality of collimating optics 122, where it is collimated and directed to the first dispersive element 124. As shown, the first plurality of collimating 122 optics may include a plurality of all-reflective optics (e.g., mirrors), and in one particular example, may include a reflective triplet. As discussed herein, reflective triplets may include a three-mirror all-reflective triplet including a primary mirror 300, a secondary mirror 302, and a tertiary mirror 304. In one example, the reflective triplet may include a positive power primary mirror 300 that is a conic or higher order aspheric mirror, a negative power secondary mirror 302 that is a conic or higher order aspheric mirror, and a positive power tertiary mirror 304 that is a conic or higher order aspheric mirror. An example of the surface data of an optical prescription of the first imaging spectrometer 106, as well as the second imaging spectrometer 108, is discussed below with reference to FIG. 7A-7C.

Electromagnetic radiation received along the first optical path 114 at the primary mirror 300, is directed to the secondary mirror 302 by the primary mirror 300. The secondary mirror 302 receives the electromagnetic radiation from the primary mirror 300 and directs the electromagnetic radiation to the tertiary mirror 304. The tertiary mirror 304 receives the electromagnetic radiation from the secondary mirror 302 and directs the electromagnetic radiation to the dispersive element 124. As shown, the first dispersive element 124 may be positioned in the collimated space of the first imaging spectrometer 106.

The first dispersive element 124 receives the electromagnetic radiation from the tertiary mirror 304 of the first plurality of collimating optics 122 and disperses the electromagnetic radiation into a plurality of spectral bands, each spectral band having a range of associated wavelengths. While shown in FIG. 3 as a reflective diffraction grating, in various other examples, the first dispersive element 124 may include a transmissive diffraction grating. Moreover, in certain examples, the diffraction grating may be replaced with any other suitable diffractive element, such as a prism or a grating prism (i.e., a "grism"). Parameters of the diffraction grating, such as size, clear aperture, grating groove density, grating groove profile (including blaze angle), and diffraction orders, may be chosen based on the particular application and operating parameters of the first imaging spectrometer 106.

The dispersed electromagnetic radiation is received at the first plurality of focusing optics 126, which collectively focuses the dispersed electromagnetic radiation at the image plane 136 of the first imaging spectrometer 106. As shown in FIG. 3, the first plurality of focusing optics 126 may also include a plurality of all-reflective optics, and in one particular example, may include a reflective triplet (i.e., a second reflective triplet). The second reflective triplet may include a primary mirror 306, a secondary mirror 308, and a tertiary mirror 310, as discussed above with reference to the reflective triplet of the first plurality of collimating optics 122. The primary mirror 306 receives the dispersed electromagnetic radiation from the first dispersive element 124, and directs the dispersed electromagnetic radiation to the secondary mirror 308, which receives and directs the dispersed electromagnetic radiation to the tertiary mirror 310. The tertiary mirror 310 directs the dispersed electromagnetic radiation to the image plane 136 (i.e., the final image plane of the first imaging spectrometer 106).

Accordingly, in at least one example, the first imaging spectrometer 106 includes an all-reflective optical assembly. In certain implementations, an all-reflective optical assembly offers the benefit of a high signal-to-noise ratio (SNR) while limiting stray light and ghost images which may adversely affect imaging operations.

As further shown in FIG. 3, in at least one example the first imaging spectrometer 106 includes an optical sensor 134 positioned at the corresponding image plane 136. The optical sensor 134 may receive and image the plurality of spectral bands dispersed by the first dispersive element 124 and focused by the first plurality of focusing optics 126. The optical sensor 134 may include any suitable focal plane array, such as a charge coupled device (CCD) or complementary metal-oxide semiconductor (CMOS) sensor. The optical sensor 134 includes a plurality of individual detector elements, which may be referred to as pixels. Each pixel is configured to collect and integrate photons of the received electromagnetic radiation and provide a readout value representative of the accumulated flux of the incident electromagnetic radiation. In one example, the first imaging spectrometer 106 may include a read-out integrated circuit (ROIC) which communicates readout values to an imaging processor. Pixels may be arranged in one or more regions that are responsive to different spectral bands. In one example, the first imaging spectrometer 106 is responsive to one or more wavelengths ranges within a subset of the infrared wavelength band, such as one or ranges within the near-infrared (NIR) wavelength band, the short-wavelength infrared (SWIR) wavelength band, the mid-wavelength infrared (MWIR) wavelength band, and/or the long-wavelength infrared (LWIR) wavelength band.

Referring to FIG. 4, there is illustrated a more detailed profile view of the second imaging spectrometer 108, and associated optical arrangement 120. As discussed herein, the second imaging spectrometer 108 may include a second plurality of collimating optics 128, a second dispersive element 130, and a second plurality of focusing optics 132. Similar to the first imaging spectrometer 106, electromagnetic radiation directed along the second optical path 116 (shown in FIG. 1) is received at the second plurality of collimating optics 128, where it is collimated and directed to the second dispersive element 130. As shown, the second plurality of collimating optics 128 may include a plurality of all-reflective optics (e.g., mirrors), and in one particular example, may include a reflective triplet (i.e., a third reflective triplet). As discussed above, the reflective triplet may include a three-mirror all-reflective triplet including a primary mirror 400, a secondary mirror 402, and a tertiary mirror 404.

Electromagnetic radiation received along the second optical path 116 at the primary mirror 400 is directed to the secondary mirror 402 by the primary mirror 400. The secondary mirror 402 receives the electromagnetic radiation from the primary mirror 400 and directs the electromagnetic radiation to the tertiary mirror 404. The tertiary mirror 404 receives the electromagnetic radiation from the secondary mirror 402 and directs the electromagnetic radiation to the second dispersive element 130. As illustrated in FIG. 4, the second dispersive element 130 may be positioned in the collimated space of the second imaging spectrometer 108. The second dispersive element 130 receives the electromagnetic radiation from the tertiary mirror 404 of the second plurality of collimating optics 128 and disperses the electromagnetic radiation into a plurality of spectral bands, each spectral band having a range of associated wavelengths. Similar to the first dispersive element 124 of the first imaging spectrometer 106, the second dispersive element 130 may be a reflective diffraction grating, a transmissive diffraction grating, a prism, or a grism, to name a few examples. The dispersed electromagnetic radiation is received at the second plurality of focusing optics 132, which collectively focuses the dispersed electromagnetic radiation at the second image plane 140.

As shown in FIG. 4, the second plurality of focusing optics 132 may also include a plurality of all-reflective optics, and in one particular example, may include an reflective triplet (i.e., a fourth reflective triplet). The reflective triplet of the second plurality of focusing optics 132 may include a primary mirror 406, a secondary mirror 408, and a tertiary mirror 410 as discussed above with reference to the to the first, second, and third reflective triplets. The primary mirror 406 receives the dispersed electromagnetic radiation from the second dispersive element 130, and directs the dispersed electromagnetic radiation to the secondary mirror 408, which receives and directs the dispersed electromagnetic radiation to the tertiary mirror 410. The tertiary mirror 410 directs the dispersed electromagnetic radiation to the image plane 140 (i.e., final image plane of the second imaging spectrometer 108). Accordingly, in at least one example, the second imaging spectrometer 108 may also include an all-reflective optical assembly.

As shown in FIG. 4, in at least one example, the second imaging spectrometer 108 includes an optical sensor 138 positioned at the corresponding image plane 140. The optical sensor 138 may receive and image the plurality of spectral bands dispersed by the second dispersive element 130 and focused by the second plurality of focusing optics 132. Similar to the optical sensor 134 of the first imaging spectrometer 106, the optical sensor 138 may include any suitable focal plane array, such as a charge coupled device (CCD) or complementary metal-oxide semiconductor (CMOS) sensor. Each pixel of the optical sensor 138 is configured to collect and integrate photons of the received electromagnetic radiation and provide a readout value representative of the accumulated flux of the incident electromagnetic radiation. In one example, the second imaging spectrometer 108 may include a read-out integrated circuit (ROIC) which communicates readout values to an imaging processor, which may be the same processor that is coupled to the first imaging spectrometer. Pixels may be arranged in one or more regions that are responsive to different spectral bands. In one example, the second imaging spectrometer 108 is responsive to one or more wavelengths ranges within a subset of the infrared wavelength band, such as one or ranges within the near-infrared (NIR) wavelength band, the short-wavelength infrared (SWIR) wavelength band, the mid-wavelength infrared (MWIR) wavelength band, and/or the long-wavelength infrared (LWIR) wavelength band. In one particular example, a wavelength range of the first optical sensor 134 and a wavelength range of the second optical sensor 138 are selected to provide broadband support.

As discussed above, the first imaging spectrometer 106 and the second imaging spectrometer 108 may each have an f-number that is independent of the f-number of the foreoptics 102. In one example, this allows the first imaging spectrometer 106 to have an f-number that is different from the f-number of the foreoptics 102, and also allows the second imaging spectrometer 108 to have an f-number that is different from the f-number of the foreoptics 102. For purposes of explanation, in an example where the foreoptics 102 real entrance pupil has a diameter of 4.0 inches and the foreoptics 102 have a focal length of 54.5 inches, the f-number value of the foreoptics 102 may be f/13.6. In such an example, the first imaging spectrometer 106 may have an entrance pupil diameter (i.e., the real exit pupil 104 diameter of the foreoptics 102) of 1.12 inches and an f-number value of f/4.0. Such an f-number may be suitable for spectral imaging within a spectral band of 800 nm-2400 nm (e.g., SWIR wavelength band). In such an example, the second imaging spectrometer 108 may have an entrance pupil diameter (i.e., the real exit pupil 104 diameter of the foreoptics 102) of 1.12 inches and an f-number value of f/3.37. Such an f-number may be suitable for spectral imaging within a spectral band of 8000 nm-13000 nm (e.g., LWIR wavelength band).

Referring to FIG. 5 and FIG. 6, illustrated is a top-side view of the first imaging spectrometer 106 of FIG. 3 and a top-side view of the second imaging spectrometer 108 of FIG. 4, respectively. In particular, the ray traces within each of FIG. 5 and FIG. 6 illustrate the different lens speed of each of the corresponding imaging spectrometers 106, 108. In comparing FIG. 5 and FIG. 6, it is apparent that the first imaging spectrometer 106 and the second imaging spectrometer 108 have different f-numbers.

Figure 7A:
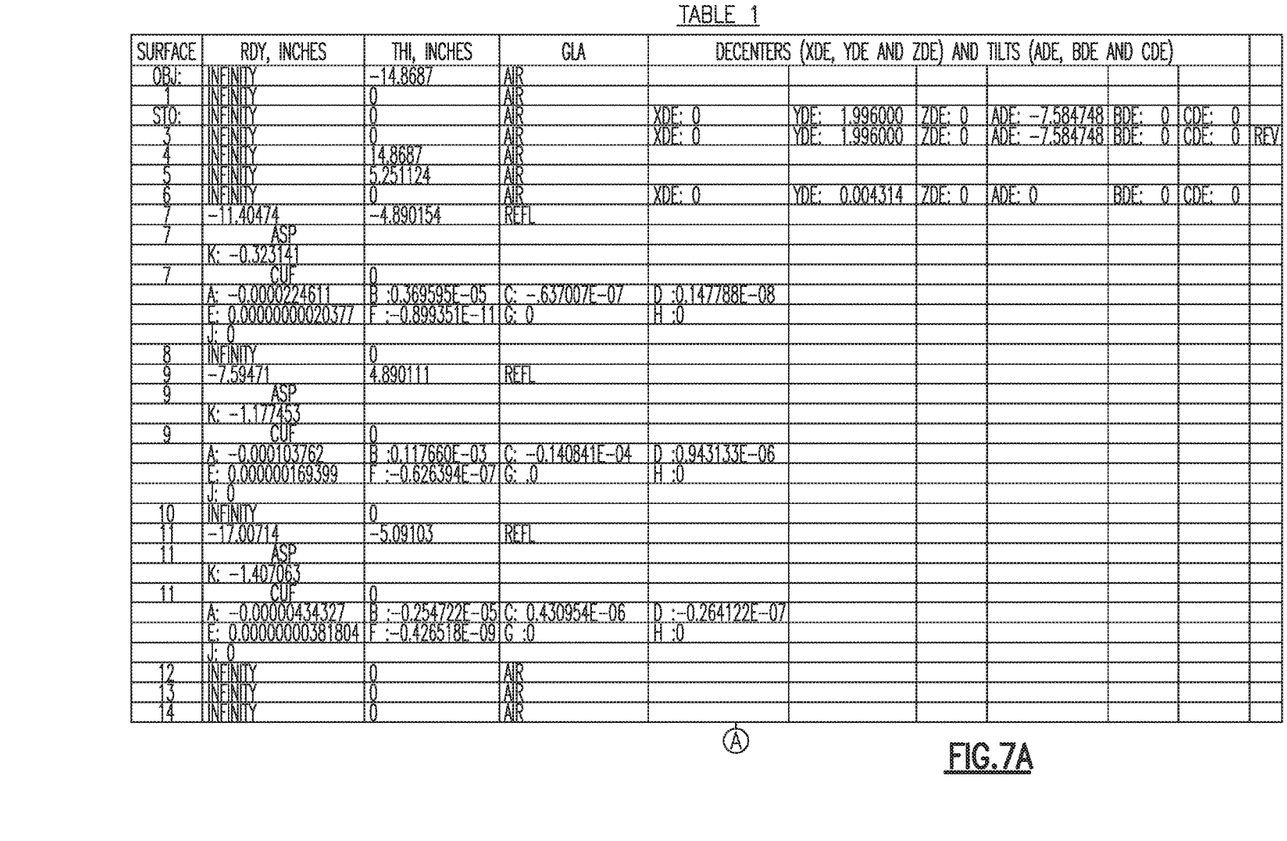
FIG. 7A-7C is a table of surface data for an optical prescription of the optical arrangement of FIG. 2, according to various examples discussed herein.
Figure 7B:
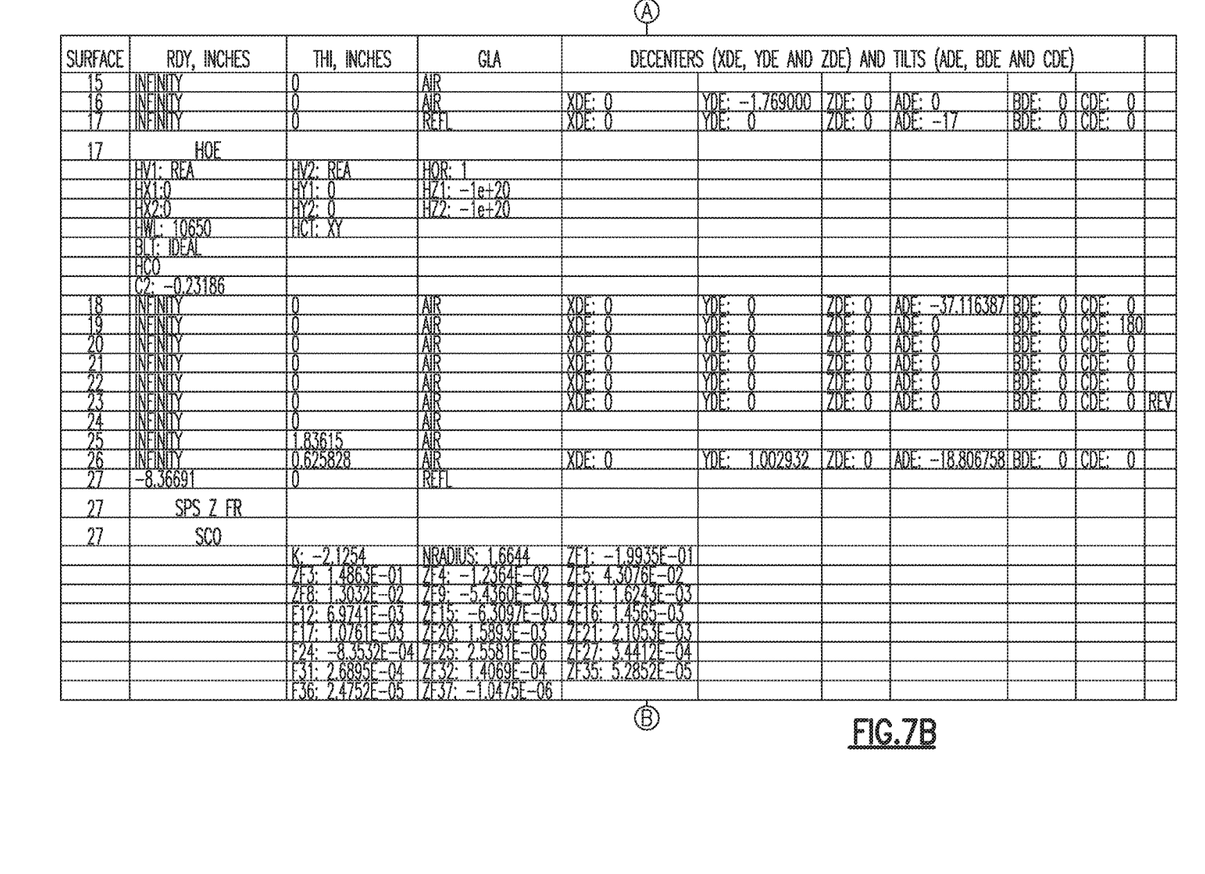
Figure 7C:
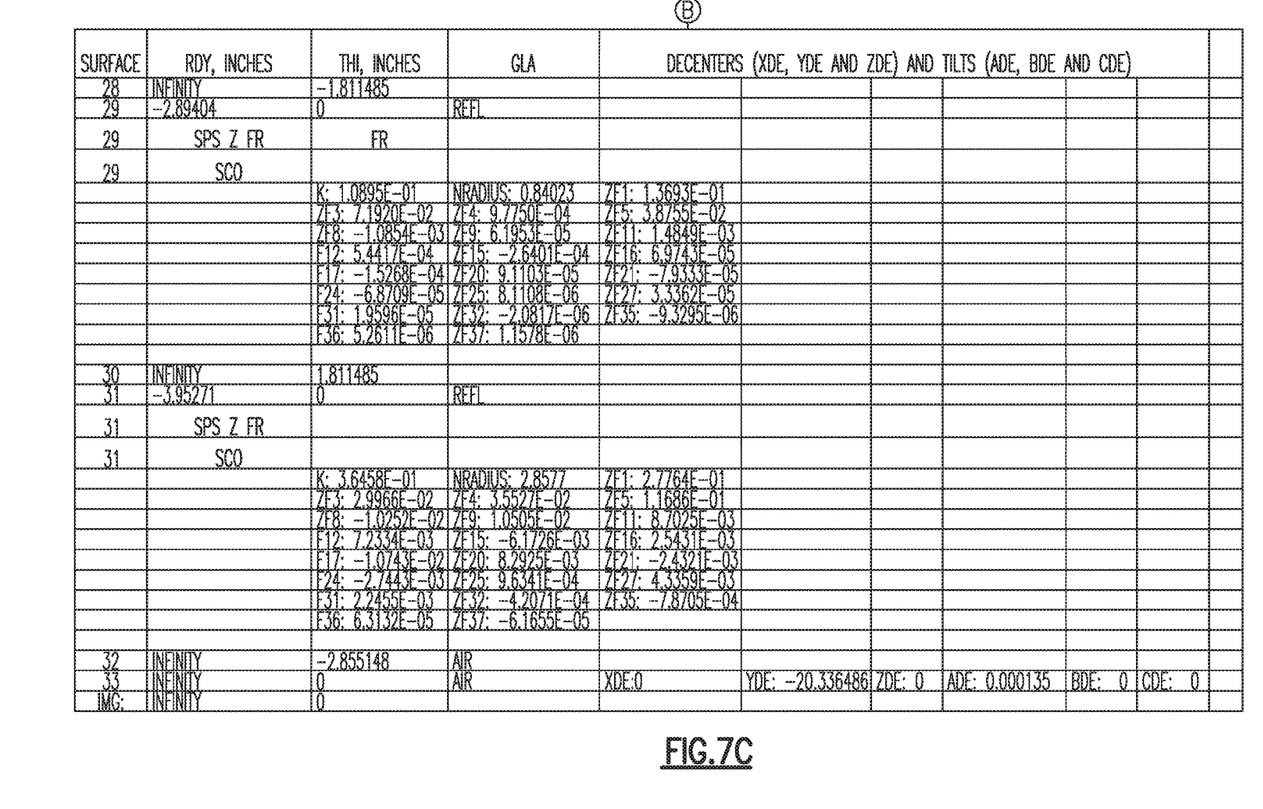

FIG. 7A-C provides a table (TABLE 1) of surface data for an optical prescription for an example of the modular imaging spectrometer assembly 100 illustrated in FIG. 1 and FIG. 2. The optical prescription for this example of the spectrometer assembly 100 may be generated using an equation which is an industry standard and which would be known to those skilled in the art. It is to be appreciated however, that the prescription given in TABLE 1 is merely exemplary, and that the prescriptions of various examples of the spectrometer assembly 100 are determined by the intended imaging task to be performed by the spectrometer assembly 100. Specifically, TABLE 1 provides a radius (RDY) in inches, a thickness (THI) in inches, a glass type (GLA), a decenter in inches, a tilt angle in degrees, and, where appropriate, indicates an aspherical surface (ASP) and a Fresnel Base Curvature (CUF) (e.g., CUF is identified when not equal to 1). Each of the decenters and tilts are specified in three orthogonal dimensions, XDE, YDE, ZDE, and ADE, BDE, CDE, respectively. TABLE 1 also indicates holographic order elements (HOE), special surface fringe Zernike type surfaces (SPS Z FR), surface coefficients (SCO) of the special surface fringe Zernike type surfaces. TABLE 1 further indicates those optical elements which are arranged in a reverse order (REV) with a reverse sign.

Figure 8:
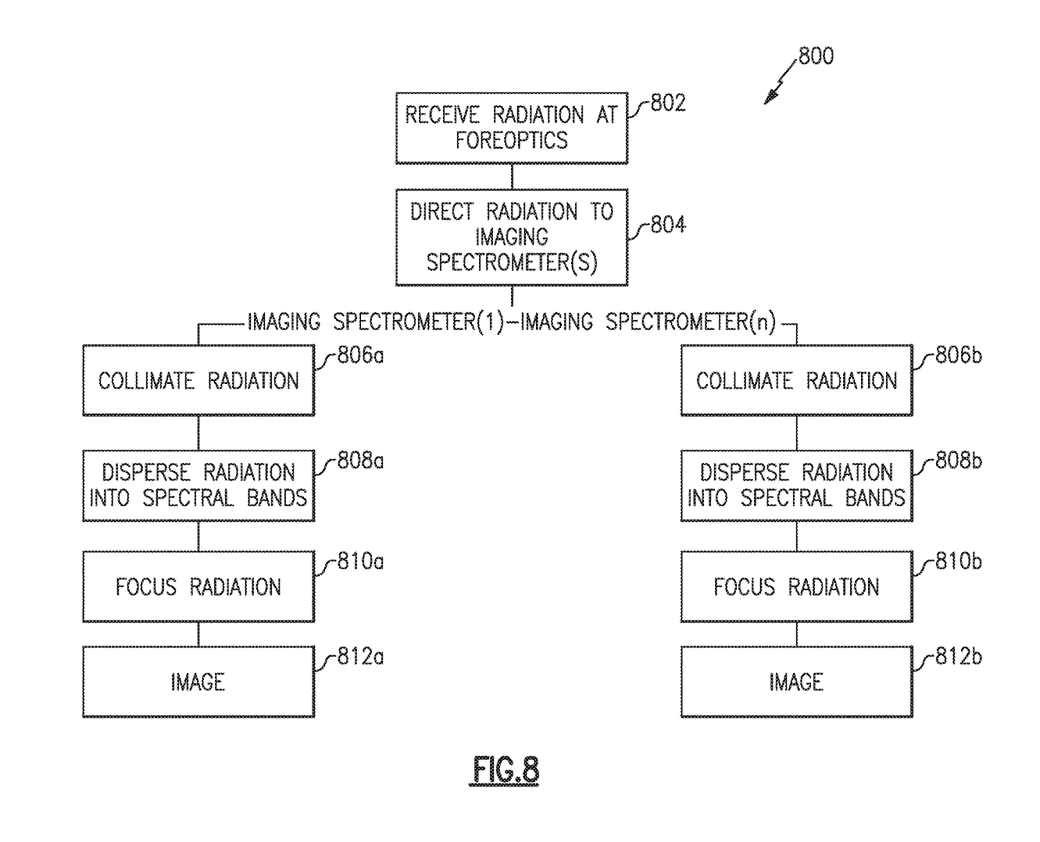
FIG. 8 is a process flow for operating a modular imaging spectrometer assembly according to various examples discussed herein.

As described above with reference to at least FIGS. 1-6, several examples perform processes for spectral imaging. In some examples, these processes are executed by operating a modular imaging spectrometer assembly, such as the spectrometer assembly 100 described above with reference to FIGS. 1-6. One example of such a process 800 is illustrated in FIG. 8. Process 800 includes the acts of receiving electromagnetic radiation at foreoptics, directing the electromagnetic radiation to one or more imaging spectrometers, and, at the one or more imaging spectrometers, collimating, dispersing, and focusing the electromagnetic radiation, and generating a spectral image. The process 800 of FIG. 8 is described with continuing reference to the spectrometer assembly 100 of FIG. 1, and associated optical arrangement, as shown in FIG. 2.

In act 802 the process 800 includes receiving electromagnetic radiation from a scene at foreoptics 102 having a first f-number. The foreoptics 102 may include an all-reflective foreoptics assembly that produces a real exit pupil 104. In one example, act 802 includes receiving the electromagnetic radiation from a real entrance pupil and directing the electromagnetic radiation with a foreoptics primary mirror, a foreoptics secondary mirror, a foreoptics tertiary mirror, and a foreoptics quaternary mirror to form the real exit pupil 104. Examples of a foreoptics primary mirror 202, a foreoptics secondary mirror 204, a foreoptics tertiary mirror 206, and a foreoptics quaternary mirror 208 are illustrated in FIG. 2.

In act 804, the process 800 may include directing the electromagnetic radiation from the real exit pupil 104 of the foreoptics 102 to one or more imaging spectrometers (e.g., a first imaging spectrometer 106 and a second imaging spectrometer 108). In one example, act 804 includes directing the electromagnetic radiation along a first optical path 114 to a first imaging spectrometer 106 and along a second optical path 116 to a second imaging spectrometer 108. However, in various other examples the spectrometer assembly may include any number of imaging spectrometers, and, accordingly, act 804 may include directing the electromagnetic radiation to each of any number of imaging spectrometers. Actions for directing the electromagnetic radiation to the one or more imaging spectrometers may be include positioning one or more beam directing elements which field split and/or spectrally split the received electromagnetic radiation. For instance, act 804 may include directing the electromagnetic to the first imaging spectrometer 106 with a first slit aperture 110 and directing the electromagnetic radiation to the second imaging spectrometer 108 with a second slit aperture 112.

In act 806a, the process 800 may include receiving the electromagnetic radiation along the first optical path 114 at the first imaging spectrometer 106, and collimating the electromagnetic radiation with a first plurality of collimating optics 122. In one example, collimating the electromagnetic radiation with the first plurality of collimating optics 122 includes passing the electromagnetic radiation through a first plurality of mirrors of a first reflective triplet, prior to dispersing the electromagnetic radiation. As illustrated in FIG. 3, one example of the first reflective triplet includes a primary mirror 300, a secondary mirror 302, and a tertiary mirror 304.

In act 808a, the process 800 may include dispersing the electromagnetic radiation into a first plurality of spectral bands with a dispersive element 124. While in one example, act 808a may include dispersing the electromagnetic radiation with a reflective diffraction grating, in various other examples the process 800 may including dispersing the electromagnetic radiation with other dispersive elements such as a transmissive diffraction grating, a prism, or a grism. In act 810a, the process 800 includes receiving the dispersed electromagnetic radiation at a first plurality of focusing optics 126, and focusing the plurality of spectral bands onto an image plane 136 of the first imaging spectrometer 106. In one example, focusing the plurality of spectral bands includes passing the electromagnetic radiation through a second plurality of mirrors of a second reflective triplet. One example of the second reflective triplet includes a primary mirror 306, a secondary mirror 308, and a tertiary mirror 310, as shown in FIG. 3. In act 812a, the process 800 includes receiving the plurality of spectral bands at the image plane 136, and in particular, an optical sensor 134 positioned at the image plane 136, and generating a spectral image based on the received plurality of spectral bands.

As discussed above, in various examples the spectrometer assembly (e.g., the spectrometer assembly 100 of FIG. 1) may include more than one imaging spectrometer, and each imaging spectrometer 106, 108 may have an f-number that is independent of an f-number of the foreoptics 102 and the f-numbers of the other imaging spectrometers. Accordingly, the process 800 of FIG. 8 may further includes acts 806b, 808b, 810b, and 812b each of which may be performed by another ("n") imaging spectrometer of the discussed spectrometer assembly. Acts, 806b, 808b, 810b, and 812b correspond to acts 806a, 808a, 810a, and 812a, and may include collimating, dispersing, and focusing the electromagnetic radiation with the second imaging spectrometer 108, and generating a spectral image at a second image plane 140 thereof.

Accordingly, aspects and embodiments are generally directed to a modular imaging spectrometer assembly and a method of operation thereof. As discussed above, various examples of the modular imaging spectrometer assembly described herein provide a configurable and customizable imaging spectrometer assembly arrangement that may be adapted based on the application, imaging conditions, or desired performance.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A modular imaging spectrometer assembly comprising:
   an all-reflective foreoptics assembly positioned to receive electromagnetic radiation from a scene and produce a real exit pupil, the all-reflective foreoptics assembly having a first f-number;
   a first imaging spectrometer including a first all-reflective optical assembly configured to receive and disperse the electromagnetic radiation into a first plurality of spectral bands at a first image plane, the first imaging spectrometer having a second f-number that is independent of the first f-number, wherein the first all-reflective optical assembly includes:
      a first plurality of collimating optics to receive and collimate the electromagnetic radiation from the at least one slit aperture to produce first collimated electromagnetic radiation,
      a first dispersive element positioned to receive the first collimated electromagnetic radiation from the first plurality of collimating optics and disperse the first collimated electromagnetic radiation into the first plurality of spectral bands, and
      a first plurality of focusing optics to focus the dispersed electromagnetic radiation at the first image plane;
   a second imaging spectrometer spatially separated from the first imaging spectrometer, the second imaging spectrometer including a second all-reflective optical assembly configured to receive and disperse the electromagnetic radiation into a second plurality of spectral bands at a second image plane, the second imaging spectrometer having a third f-number that is independent of the first f-number, wherein the second all-reflective optical assembly includes:
      a second plurality of collimating optics to receive and collimate the electromagnetic radiation from the at least one slit aperture to produce second collimated electromagnetic radiation,
      a second dispersive element positioned to receive the second collimated electromagnetic radiation from the second plurality of collimating optics and disperse the second collimated electromagnetic radiation into the second plurality of spectral bands; and
      a second plurality of focusing optics to focus the dispersed electromagnetic radiation at the second image plane; and
   at least one slit aperture interposed between the all-reflective foreoptics assembly and the first imaging spectrometer and the second imaging spectrometer, the at least one slit aperture being positioned to receive the electromagnetic radiation from the real exit pupil and direct the electromagnetic radiation to the first imaging spectrometer and the second imaging spectrometer.

2. The modular imaging spectrometer assembly of claim 1, wherein the second f-number and the third f-number are independent of each other.

3. The modular imaging spectrometer assembly of claim 2, wherein each of the first f-number, second f-number, and third f-number has a different value.

4. The modular imaging spectrometer assembly of claim 1, wherein the at least one slit aperture includes a first slit aperture configured to direct the electromagnetic radiation along a first optical path to the first imaging spectrometer and a second slit aperture configured to direct the electromagnetic radiation along a second optical path to the second imaging spectrometer.

5. The modular imaging spectrometer assembly of claim 1, wherein the first plurality of collimating optics is a first reflective triplet and the first plurality of focusing optics is a second reflective triplet.

6. The modular imaging spectrometer assembly of claim 5, wherein the first dispersive element is a diffraction grating.

7. The modular imaging spectrometer assembly of claim 1, wherein the second plurality of collimating optics is a third reflective triplet and the second plurality of focusing optics is a fourth reflective triplet.

8. The modular imaging spectrometer assembly of claim 1, wherein the first imaging spectrometer includes a first optical sensor positioned at the first image plane at configured to detect electromagnetic radiation within the long-wave infrared (LWIR) spectrum, and wherein the second imaging spectrometer includes a second optical sensor positioned at the second image plane at configured to detect electromagnetic radiation within the short-wave infrared (SWIR) spectrum.

9. A method of operating a modular all-reflective imaging spectrometer assembly, the method comprising:
   receiving electromagnetic radiation from a scene with an all-reflective foreoptics assembly having a first f-number;
   directing the electromagnetic radiation from a real exit-pupil of the all-reflective foreoptics assembly along a first optical path through a first slit aperture to a first imaging spectrometer and along a second optical path through a second slit aperture to a second imaging spectrometer, the first optical path being spatially separated from the second optical path;
   with a first all-reflective optical assembly of the first imaging spectrometer, collimating the electromagnetic radiation to produce first collimated electromagnetic radiation, dispersing the first collimated electromagnetic radiation into a first plurality of spectral bands and focusing the first plurality of spectral bands onto a first image plane of the first imaging spectrometer, the first imaging spectrometer having a second f-number that is independent of the first f-number;
   with a second all-reflective optical assembly of the second imaging spectrometer, collimating the electromagnetic radiation to produce second collimated electromagnetic radiation, dispersing the second collimated electromagnetic radiation into a second plurality of spectral bands and focusing the second plurality of spectral bands onto a second image plane of the second imaging spectrometer, the second imaging spectrometer having a third f-number that is independent of the first f-number.

10. The modular imaging spectrometer assembly of claim 9, wherein the second f-number and the third f-number are independent of each other.

11. The modular imaging spectrometer assembly of claim 10, wherein each of the first f-number, second f-number, and third f-number has a different value.

12. The method of claim 9, wherein collimating the electromagnetic radiation with the first all-reflective optical assembly of the first imaging spectrometer includes passing the electromagnetic radiation through a first plurality of mirrors of a first reflective triplet, and wherein collimating the electromagnetic radiation with the second all-reflective optical assembly of the second imaging spectrometer includes passing the electromagnetic radiation through a second plurality of mirrors of a second reflective triplet.

13. The method of claim 12, wherein focusing the first plurality of spectral bands onto the first image plane of the first imaging spectrometer includes passing the electromagnetic radiation through a third plurality of mirrors of a third reflective triplet, and wherein focusing the second plurality of spectral bands onto the second image plane of the second imaging spectrometer includes passing the electromagnetic radiation through a fourth plurality of mirrors of a fourth reflective triplet.

14. A modular all-reflective imaging spectrometer assembly comprising:

an all-reflective foreoptics assembly positioned to receive electromagnetic radiation from a scene and produce a real exit pupil, the all-reflective foreoptics assembly having a first f-number;

a first imaging spectrometer including:

a first all-reflective optical assembly configured to receive, collimate, and then disperse the electromagnetic radiation into a first plurality of spectral bands at a first image plane, the first imaging spectrometer having a second f-number that is independent of the first f-number, and a first optical sensor positioned at the first image plane and configured to receive and image the first plurality of spectral bands; and a second imaging spectrometer spatially separated from the first imaging spectrometer, the second imaging spectrometer including:

a second all-reflective optical assembly configured to receive, collimate, and then disperse the electromagnetic radiation into a second plurality of spectral bands at a second image plane, the second imaging spectrometer having a third f-number that is independent of the first f-number, and a second optical sensor positioned at the second image plane and configured to receive and image the second plurality of spectral bands.

* * * * *

UNITED STATES PATENT AND TRADEMARK OFFICE
CERTIFICATE OF CORRECTION

PATENT NO. : 10,168,209 B2
APPLICATION NO. : 15/481834
DATED : January 1, 2019
INVENTOR(S) : Susan B. Spencer et al.

Page 1 of 1

It is certified that error appears in the above-identified patent and that said Letters Patent is hereby corrected as shown below:

In the Claims

Column 14, Line 41 Claim 9 should read:
independent of the first f-number; and

Signed and Sealed this
Twelfth Day of February, 2019

Andrei Iancu
*Director of the United States Patent and Trademark Office*